United States Patent [19]

Heenan et al.

[11] Patent Number: 4,596,622
[45] Date of Patent: * Jun. 24, 1986

[54] METHOD FOR MAKING AN ABRASION-RESISTANT REFLECTIVE MARKER

[75] Inventors: Sidney A. Heenan, Park Ridge; Robert M. Flanagan, Lincolnshire; Ramon J. Ascencio, Skokie, all of Ill.

[73] Assignee: Amerace Corporation, Hackettstown, N.J.

[*] Notice: The portion of the term of this patent subsequent to Nov. 11, 1997 has been disclaimed.

[21] Appl. No.: 179,176

[22] Filed: Aug. 18, 1980

Related U.S. Application Data

[63] Continuation of Ser. No. 82,307, Oct. 5, 1979, abandoned, which is a continuation of Ser. No. 961,096, Nov. 16, 1978, abandoned, which is a continuation of Ser. No. 789,247, Apr. 20, 1977, abandoned.

[51] Int. Cl.$^4$ .......................... B32B 17/10; E01F 9/04
[52] U.S. Cl. ................................ 156/275.5; 156/295; 156/329; 156/331.7; 156/335.7
[58] Field of Search ............. 156/99, 98, 242, 94, 156/292, 71, 310, 295, 329, 331, 272.2, 275.5, 331.7, 273.5; 404/16, 9, 12, 14; 428/38, 34, 412, 422, 911

[56] References Cited

U.S. PATENT DOCUMENTS

| | | | |
|---|---|---|---|
| 3,332,327 | 7/1967 | Heenan | 404/16 |
| 3,382,137 | 5/1968 | Schreiber et al. | 156/99 |
| 3,508,987 | 4/1970 | Burkley et al. | 156/99 |
| 3,580,796 | 5/1971 | Hick, Jr. et al. | 156/99 |
| 3,671,370 | 6/1972 | Littell, Jr. | 156/99 |
| 3,738,962 | 6/1973 | Loudas et al. | 260/32.6 NR |
| 3,822,158 | 7/1974 | Hoffman et al. | 404/16 |
| 3,939,111 | 2/1976 | Schollenberger et al. | 260/32.6 NR |
| 3,947,620 | 3/1976 | Plant | 428/412 |
| 4,232,979 | 11/1980 | Johnson et al. | 404/16 |

OTHER PUBLICATIONS

"Micro Sheet Glass Coated Plastics", Hertyl, Feb. 1975, 30th Anniversary Technical Conference, Reinforced Plastics Industry Inc., Section 9-G, p. 1.

Primary Examiner—Michael Ball
Attorney, Agent, or Firm—David Teschner; Ronald A. Sandler

[57] ABSTRACT

A thin transparent glass sheet is bonded to the substantially flat planar front face of a cube-corner-type retrodirective reflector formed of a light-transmitting synthetic organic resin for covering at least the reflex reflective area thereof. A liquid urethane resin radiation curable to a transparent solid state is applied to the front face of the reflector and one side of the glass sheet is coated with a silane solution which is allowed to dry, and which side is then placed against the urethane resin on the reflector front face and pressed thereagainst until all air bubbles have been forced from the urethane resin and it has spread to a layer of predetermined thickness. The resulting laminate is preheated to a temperature approximating the maximum temperature expected to be experienced in use and then, while at the elevated temperature, the urethane resin layer is radiation cured, for bonding the glass sheet and the reflector together, curing at this temperature causing the adhesive to set so that the glass will be under compression when the laminate is exposed to the working temperature range, and the laminate is then maintained at about 150° for 30 to 60 minutes to enhance the chemical bonding of the silane to the glass and the adhesive.

17 Claims, 3 Drawing Figures

METHOD FOR MAKING AN ABRASION-RESISTANT REFLECTIVE MARKER

This is a continuation of application Ser. No. 082,307 filed Oct. 5, 1979, now abandoned which was a continuation of abandoned application Ser. No. 961,096, filed Nov. 16, 1978, which was a continuation of abandoned application Ser. No. 789,247, filed Apr. 20, 1977.

BACKGROUND OF THE INVENTION

The present invention relates to reflectors and, in particular, to methods for improving the abrasion-resistance of such reflectors, and, in particular, pavement markers.

Prior art reflective pavement markers have attempted to overcome the problem of abrasion caused by tire contact by several means. While the simplest solution might appear to be formation of the pavement marker reflector of an inherently abrasion-resistant material, such materials do not provide the other qualities necessary in a pavement marker reflector, such as economy and ease of manufacture, high quality optical performance, impact resistance, weatherability and resistance to chemicals encountered on the roadway and ability to withstand a wide range of in-service temperatures. Indeed, no material has been found which incorporates all of these attributes to the optimum degree. Accordingly, prior art reflective pavement markers, and in particular retrodirective cube-corner-type reflective pavement markers, have necessitated a compromise among these several desirable characteristics.

In the prior U.S. Pat. No. 3,332,327, assigned to the assignee of the present invention, there is disclosed a cube-corner reflex reflective pavement marker which is formed of a light-transmitting synthetic organic plastic resin which has good optical characteristics and impact resistance and which has a front face which is preferably disposed at a predetermined angle to the roadway surface to achieve an optimum compromise between abrasion resistance and self-cleaning or wiping of the front face by the tires of vehicular traffic. With that marker, it has been found that mechanical abrasion decreases when the angle of the front face of the pavement marker is increased, but as that angle increases, the cleaning action obtained by tire wiping on the front face of the lens decreases. Furthermore, when such markers are used in areas where, in winter months, abrasive material such as sand and salt are deliberately distributed over the roadway surface, the abrasion problem becomes particularly acute as the wiping action of the vehicle tires, combined with those abrasive materials, tends to scratch and grind the front face of the plastic lens and drastically diminish the optical effectiveness and the reflex reflective quality of the pavement marker.

Abrasion-resistant coatings which have not had the hardness of glass have been provided in the prior art for coating the surfaces of a plastic object which might be exposed to abrasive elements. But when used to coat reflective pavement markers, such coatings have either failed to provide the necessary abrasion resistance or have required curing temperatures which were so high that they distorted the plastic material of the reflector, thereby resulting in a serious deterioration of the reflector optics.

A paper entitled "Microsheet Glass Coated Plastics" by W. Hertl was published in February 1975 at the 30th Anniversary Technical Conference, Reinforced Plastics/Composites Institute, The Society of the Plastics Industry Inc., Section 9-G, Page 1, a copy of which article is filed herewith. The Hertl article discloses methods of laminating thin glass sheets to thick plastic substrates formed of Lexan and Plexiglas. But the adhesives utilized by Hertl required curing at elevated temperatures for at least several hours. Moreover, in contrast to the present invention, Hertl states that in a single side laminate, the plastic (rather than the glass) is in compression. Also, Hertl does not disclose use of a radiation curable curing system. Finally, applicants conceived use of silane and a radiation curing resin prior to publication of the Hertl article.

SUMMARY OF THE INVENTION

This invention relates to a method of improving the abrasion-resistance of a reflective pavement marker formed of a light-transmitting synthetic organic resin, by laminating to the reflector a very thin sheet of transparent glass in such a way that the resulting laminate has optical qualities at least as good as those of the original reflector and is capable of withstanding the impact forces, abrasive materials, chemical elements and temperature and weather extremes experienced on the roadway in use.

More particularly, it is an important feature of the present invention to provide a method of making an abrasion-resistant pavement marker reflector by laminating a thin glass sheet to the substantially flat planar front surface of the pavement marker reflector which is formed of a light-transmitting synthetic organic resin, by means of a liquid resin which is radiation curable to a transparent solid state, the resin preferably being a urethane resin.

It is another feature of this invention that before radiation curing of the urethane resin adhesive, the laminate is preheated to a temperate which approximates the expected maximum temperature to be experienced in use, but is low enough to prevent distortion of the reflector material.

It is another feature of this invention that the method includes coating at least one side of the glass sheet with a silane solution to promote adherence thereto of the urethane resin, the method including postheating the laminate after the urethane resin has been cured to enhance the curing of the silane.

Another feature of this invention is the addition of dimethylformamide to the urethane resin to facilitate adhesion to polycarbonate reflectors, and to inhibit the formation of gas bubbles in the urethane resin during preheating, whether used with a polycarbonate or methacrylate reflector.

These features of the invention are provided, and it is an important object of this invention to afford these advantages by the provision of a method of making an abrasion-resistant reflector by applying a thin transparent glass sheet to the substantially flat planar front face of a reflector formed of a light-transmitting synthetic organic resin, comprising the steps of applying to the front face of the reflector a liquid resin which is radiation curable to a transparent solid state, coating at least one side of the glass sheet with a silane solution, drying the solution, placing the glass sheet on the front face of the reflector with the silane-coated wide contacting the resin, pressing the glass sheet against the resin until the resin is in a layer of a thickness that will provide a substantially continuous film and also great enough to accommodate the relative changes in size of the glass sheet and the reflector material in use resulting from the different thermal coefficients of expansion thereof thereby to form a laminate, heating the laminate to a temperature low enough to avoid distortion of the reflector but which approximates the maximum expected temperature in use such that the glass, in use, will substantially at all times be in compression, such heating also serving to enhance to bonding of the silane and resin system, and irradiating the heated laminate with a radiant energy source until the resin is cured for causing it chemically to adhere to the reflector front face and to the silane-coated glass sheet, thereby securely to bond the glass sheet to the reflector front face for protection thereof against abrasion in use and without impairment of the optical qualities of the reflector.

Further features of the invention pertain to the particular arrangement of the steps of the method whereby the above-outlined and additional operating features thereof are attained.

The invention, both as to its organization and method of operation, together with further objects and advantages thereof, will best be understood by reference to the following specification taken in connection with the accompanying drawings.

DESCRIPTION OF THE PREFERRED EMBODIMENT

Figure 1:
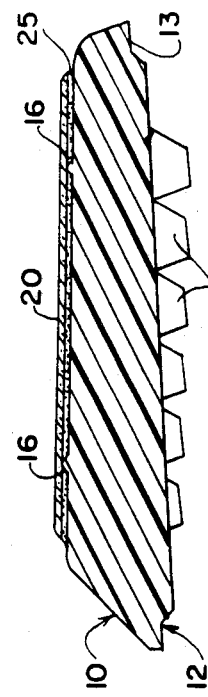
FIG. 1 is a schematic block flow diagram illustrating the method of the present invention.

Referring now to FIG. 1, there is illustrated a block-type flow diagram of the method of the present invention, wherein each of the several blocks has been assigned a reference numeral and may be considered to represent a station in a production line or process. The method of the present invention is intended for application to retrodirective cube-corner-type reflectors for pavement markers and, more particularly, has been used in manufacturing pavement markers of the type disclosed in an abandoned application, Ser. No. 681,860 of Sidney A. Heenen and Glenn W. Johnson Jr., filed Apr. 30, 1976 and also in an abandoned continuation-in-part thereof, Ser. No. 789,266, filed Apr. 20, 1977 and also in application Ser. No. 970,186, filed Dec. 18, 1978 as a continuation of said application Ser. No. 789,266. Said applications Ser. Nos. 681,860, 789,266 and 970,186 are all commonly assigned herewith. In that type of pavement marker a lens member formed of a light-transmitting synthetic organic plastic resin such as methyl methacrylate or a polycarbonate has cube-corner reflex reflector elements formed on the rear surface thereof and is mounted in use on a base member preferably found of an opaque thermoplastic resin. It will be understood that the method of the present invention has been successfully applied to other types of reflex reflective pavement markers, such as those of the type disclosed in U.S. Pat. No. 3,332,327; it also could be used with non-reflex pavement marker reflectors or in other products wherein the optical properties of plastic are desirable but because of an abrasive environment, they could not be used.

Figure 3:
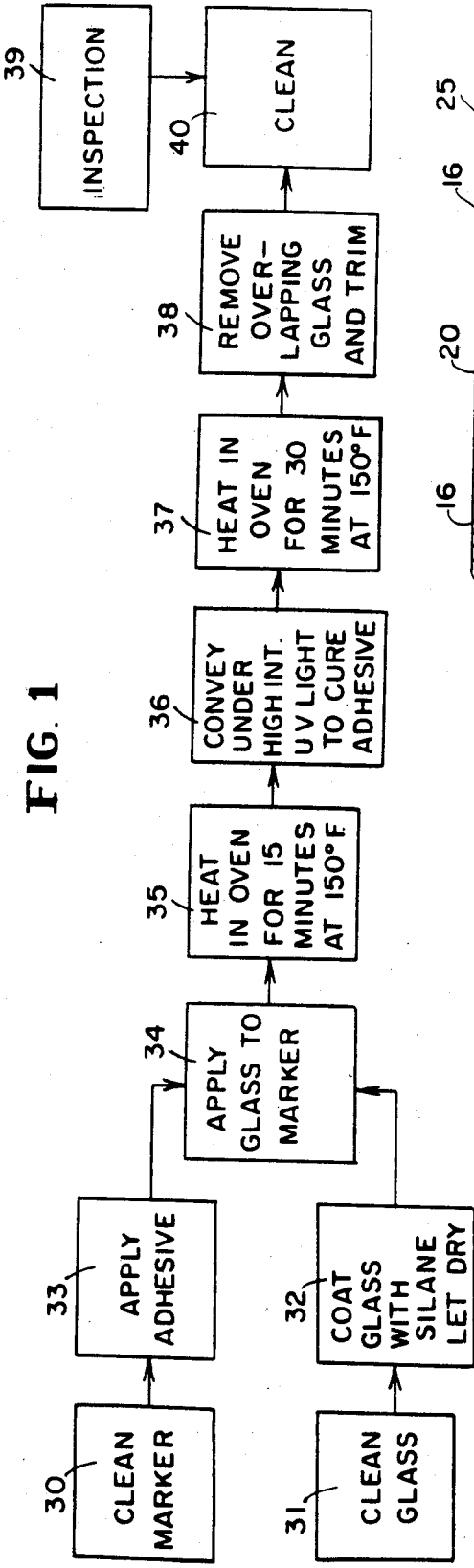
FIG. 3 is an enlarged view in vertical section taken along the line 3—3 in FIG. 2, and illustrating the finished laminate after excess portions of the glass sheet have been removed.
Figure 2:
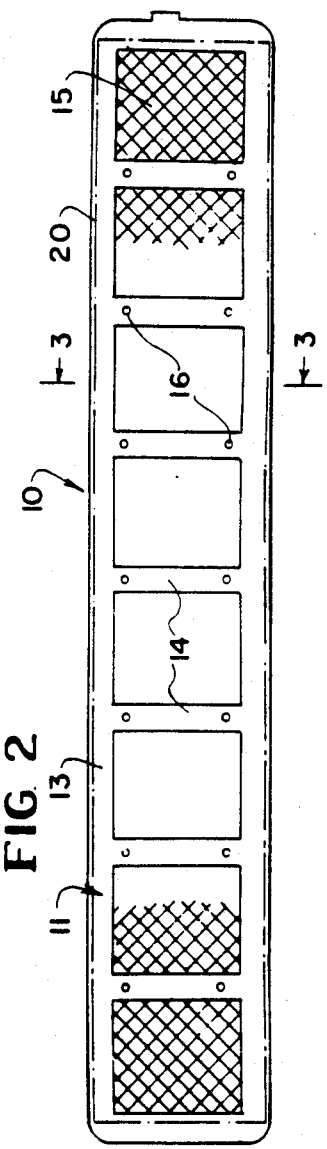
FIG. 2 is a top plan view of a pavement marker reflective lens member with which the method of the present invention may be utilized, and illustrating the position of a glass sheet as it is initially applied to the front face of the lens member.

Referring now to FIGS. 2 and 3 of the drawings, there is illustrated a lens member, generally designated by the numeral 10, which is of the type disclosed in said applications Ser. Nos. 681,860, 789,266 and 970,186 and which is generally rectangular, having a substantially planar front face 11 and a rear face 12, and being formed of a light-transmitting synthetic resin. The rear face 12 is provided with a peripheral edge portion 13 which extends about the entire periphery of the lens member 10, and a plurality of dividing portions 14 which intersect the peripheral edge portion 13 at equally spaced distances therealong, thereby dividing the lens member 10 into a plurality of generally rectangular areas circumscribed by the peripheral edge portion 13 and the dividing portions 14. In each of these rectangular areas, the rear face 12 is provided with a plurality of rearwardly projecting cube-corner reflex reflector elements 15. These rectangular arrays of cube-corner reflector elements 15 and the peripheral edge portion and dividing portions 13 and 14 are all visible through the front face 11 of the lens member 10, as seen in FIG. 2.

In performance of the method of the present invention, the flat planar front face 11 of the reflector lens member 10 may be cleaned at station 30 with water or other non-crazing solution in order to remove from the reflector any dirt, grease or other surface inpurities therefrom.

A very thin sheet 20 of transparent glass is provided for lamination to the front face 11 of the lens member 10, the glass sheet preferably being an untempered and annealed glass which has a thickness in the range from about 2 mils to about 15 mils. A suitable glass is available from Corning Glass Works as Micro-Sheet (Glass Code 0211), Thickness Reference Nos. 00 to 3, and having an index of refraction of 1.523. The glass sheet 20 is preferably provided in a shape which is substantially the same as the shape of the front face of the lens member and preferably has dimensions slightly larger than the optic portions of the lens so as to extend beyond the borders of the reflex areas and to the edges, or beyond, of the lens member. If necessary, the glass sheet 20 is cleaned at station 31 using an alcohol and deionized water solution to remove impurities therefrom.

At station 32, one side of the glass sheet is coated with a silane solution and then allowed to dry, the silane solution serving to enhance the adhesion of the glass sheet to adhesive materials. In applying the silane solution to the glass sheet 20, the solution can be applied to one side of the glass sheet 20 with a suitable applicator or the sheet 20 could be dipped in the silane solution. A suitable silane is available fron Hughson Chemicals, Lord Corporation, as Chemlock #607, which is preferably reduced to a 16% solution in denatured ethyl alcohol (one part "607" to five parts denatured ethyl alcohol). Another suitable silane is Dow Corning's Z6020 silane, which is preferably reduced to a 0.4% solution in denatured ethyl alcohol (one part Z6020 to 250 parts denatured ethyl alcohol). Still another suitable silane is Union Carbide's A-1120 silane.

At station 33 an adhesive material is applied to the front face of the lens member 10, the adhesive preferably being applied as a bead laid on the lens front face parallel to the long side of the front face and at least equal in length to the length of the glass. This shape of adhesive bead is preferable because in placing and pressing the glass in juxtaposition thereagainst the bead will spread from the center outwardly in wave fashion and expel air before it to eliminate air bubbles therein. It has been found that the adhesive may preferably comprise a clear, radiation curable, acrylourethane based coating which is curable to form a transparent totally cross-linked matrix. Such a resin has been used as a coating or as a casting resin, but it has proved to be very effective as an adhesive between the acrylic lens members and the silane-coated glass sheets. A suitable acrylourethane resin is available from Hughson Chemicals, Lord Corporation, as Part #RD-2932-44. It also is possible to use other radiation curable resins such as acrylic based resins. One such satisfactory acrylic resin is Ren Plastics (a CIBA-GEIGY Company) product known as DA-560-4 U.V. Curable Adhesive.

While the urethane resin has been found to provide excellent adhesion to acrylic substrates such as methyl methacrylate or rubber-modified methyl methacryate, its adhesion to polycarbonate substrates such as Lexan is not as strong. Accordingly, there is preferably added to the urethane resin 5% by weight of dimethylformamide (DMF), which has been found to afford good adhesion to polycarbonate without reducing the adhesion of the urethane resin to acrylics, and at the same time has served to reduce the tendency for the urethane resin to develop gas bubbles when heated, even though used with a methacrylate reflector.

At station 34 the silane-coated side of the glass sheet 20 is placed against the adhesive bead on the lens member front face 11 so as to be substantially centered over the reflex region thereof. The glass sheet 20 is then pressed gently against the adhesive bead, to form a layer 25 which covers the silane-coated side of the glass sheet 20 and the underlying portions of the lens member front face 11, this pressing also serving to drive all gas bubbles from beneath the glass sheet 20. The pressing of the glass sheet 20 against the adhesive is continued until the adhesive layer 25 provides a substantially continuous film between the glass and lens member, and preferably having a thickness in the range of from about 6 mils to about 15 mils, thereby forming a laminate wherein the glass sheet 20 is substantially centered over the reflex area of the front face 11 of the lens member 10 and extends a slight distance beyond the edges of the reflex area around the entire perimeter thereof (see FIG. 2).

To facilitate pressing of the glass sheet 20 so that the adhesive layer 25 may have a uniform thickness, small dimples 16 may be provided on the front face 11 of the lens member 10, for example, over the dividing portions 14, the dimples 16 having a height equal to the desired thickness of the adhesive layer 25. The dimples 16 will act as stops for the glass sheet 20 to limit the movement thereof toward the lens member front face 11 as the glass sheet 20 is pressed into place. Additionally, if desired, a raised rim or lip (not shown) may be provided around part of or the entire perimeter of the lens member front face 11 at the outer edges thereof to facilitate positioning of the glass sheet 20 and centering thereof over the reflex areas of the lens member 10 and to protect the edges of the glass sheet 20 in service.

It will be appreciated that, in use, the pavement markers will have to withstand a wide range of tenperatures on the roadway, these temperatures typically ranging from −30 F. to +150 F. This causes the creation of considerable stresses in the materials since there is a substantial difference in the thermal coefficients of expansion of the glass sheet 20 and the acrylic of polycarbonate reflector or lens member. For example, the thermal coefficient of expansion of acrylic is approximately nine times that of the glass sheet. Therefore, the layer 25 of adhesive between the glass sheet 20 and the plastic lens member 10 must be sufficiently thick so that, once cured, it can accommodate the changes in size occasioned by the wide differences in the thermal coefficients of expansion. A preferred thickness is 6 mils but it has been found that a continuous adhesive layer with variable thickness, even down to 1 mil, will suffice for the temperature ranges normally experienced by pavement marker reflectors in service.

It has also been recognized that, once the urethane adhesive has been cured, as the temperature of the resulting laminate drops below the temperature at which curing occurred, the plastic reflector shrinks faster than the glass and places the glass sheet 20 in compression, and increases the strength of the laminate. Conversely, as the temperature is raised above the temperature at which curing occurred, the plastic reflector expands faster than the glass and places the glass sheet in tension, thereby significantly decreasing its impact resistance. More particularly, it has been found that if the laminate is later heated to a temperature between 10° F. and 20° F. above the curing temperature, the tensile forces alone will cause the glass sheet 20 to crack.

Thus, it is an important feature of the present invention that the glass-plastic laminate is heated at station 35 to a temperature of about 150° F. before curing, preferably by placing the laminate in a 150° F. oven for about 15 minutes. It has also been found that this preheating serves to enhance the adhesion of the silane coating on the glass sheet, which coating does not adhere as effectively at room temperature, and further serves to drive off volatile components from the adhesive and change it to a semi-solid state.

For the reasons set forth above in connection with the different thermal coefficients of expansion of the glass and plastic, it is theoretically desirable to preheat the laminate to approximately the maximum temperature expected to be experienced by the pavement marker reflector in service on the roadway so that the glass will generally always be in compression during use, and to assure it will not be in tension. But it has been found that for methyl methacrylate a temperature of 180° F. causes distortion of the reflector, thereby resulting in serious degradation of the optical effectiveness of the reflector. Thus, the preheating temperature should be less than 180° F. If a polycarbonate is used, this temperature could be raised.

It has also been found that, while in general having the glass normally in compression in service tends to increase the impact resistance of the laminate, the adhesive layer is adversely affected if the compression gets too great. Thus, in very cold regions there could be problems with the stresses set up in the pavement markers when they have been cured at a very high temperature and then experience temperatures in the range of −30° F. Therefore, in order to minimize these difficulties, and because the maximum temperatures experienced in colder regions are typically less than those experienced in warmer climates, the laminate preferably is preheated to a temperature of only about 130° F. in the case of pavement markers (such as snowplowable markers) which are to be used in colder climates, as compared to the preferred temperature of 150° F. for markers to be used in warmer climates.

When the laminate has been heated to the preheat temperature, it is immediately moved to station 36 where it is then exposed to radiation for curing the urethane resin adhesive before the laminate has had a chance to cool substantially from the preheat temperature. Preferably, the movement of the heated laminate from station 35 to station 36 is accomplished in a fast, continuous operation. In the illustrated embodiment, radiation curing is achieved by an ultraviolet radiation system, the ultraviolet irradiation being accomplished, for example, in an encased box or tunnel so as to prevent escape of stray radiation.

Suitable curing of the adhesive has been accomplished by exposing it to the radiation from a 200 watt per linear inch, medium pressure, mercury vapor lamp at a distance of about 8 inches from the lamp for a time period of about 5 seconds. It will be appreciated, however, that suitable curing could also be obtained with other combinations of lamp intensity, distance to the laminate and time of exposure, it being recognized that, in general, the curing mechanism of the adhesive is directly proportional to the intensity of the radiation source and the time of exposure and is inversely proportional to the square of the distance from the source. For example, curing of the adhesive has also been effected by exposure for 5 minutes to the radiation from black light flurescent tubes, keeping the laminate at 150° F. at 2 watts per inch at a distance of about 2 inches. The adhesive also may be cured by use of a suitable electron beam curing system.

While the adhesion of the silane coating on the glass sheet 20 is enhanced by the preheating so as to be effective to promote adhesion of the urethane adhesive to the glass sheet 20, the silane coating requires subsequent heating to achieve maximum adhesion; although it will cure after an extended time period at room temperature, this curing time can be greatly accelerated by heating the laminate for a predetermined time period. Accordingly, after the urethane adhesive has been cured, at station 37 the laminate is postheated in an oven at 150° F. for a time period of between 30 and 60 minutes. Preferably, the heating is at 150° F. for 30 minutes.

At station 38, after the postheating step, the excess portions of the glass sheet 20 around the edges thereof may be removed by being trimmed or knocked off with a suitable tool. The purpose of these overlapping edges is that the ultraviolet curing mechanism of the urethane adhesive is such that the resin is imcompletely cured to a distance of approximately 0.040 inches from the surface exposed to the air, in this case the peripheral edges of the adhesive layer 25. In order to overcome this difficulty, it is normally recommended that a nitrogen inerting atmosphere or some sort of air barrier be utilized during the ultraviolet curing process. In order to obviate this precaution, the glass sheet 20 in the present invention may be oversized so as to extend beyond the perimeter of the reflex area of the reflector face a distance at least as great as the air-inhibition distance so that, after curing, the portion of the glass sheet 20 overlying the incompletely cured adhesive around the perimeter of the adhesive layer 25 may simply be removed, so that there remains a glass sheet 20 which completely covers the reflex area and is securely adhered thereto over the entire area thereof by a fully cured adhesive so as to avoid chipping or delamination of the glass sheet in service. After the excess portions of the glass sheet 20 are thus trimmed off, the edges of the sheet 20 are preferably ground to smooth them. If desired, the oversize portion of glass, if not large, may be left on the marker where vehicle tire contact will chip it down to the point where the adhesive binds the glass to the underlying substrate.

Finally, at station 39, the finished abrasion-resistant pavement marker lens member is inspected and, if necessary, is cleaned at station 40 using a No. 3 grade coarse steel wool.

It has been found that pavement markers such as the type disclosed in copending application Ser. No. 681,860, and the continuation-in-part thereof, or of the type disclosed in the 3,332,327 Heenan patent, when provided with a glass overlay by the method of the present invention, have a retained reflectivity, or improved optical efficiency in the range of 12 to 56 times that of unmodified markers of the same types, when exposed to the same conditions.

Furthermore, it has been found that the addition of the glass sheet to the pavement marker reflector by the method of the present invention serves to increase the initial reflectivity of the reflector, i.e., reflectors modified with the glass overlay by the method of the present invention have exhibited initial specific intensities as much as 50% greater than unmodified reflectors of the same type. It is believed that this phenomenon results from the fact that normally the front face of the reflector or lens member, while substantially flat and planar, has minute waves or depressions therein. It is believed that the adhesive layer 25 by which the glass sheet 20 is secured to the reflector serves to fill these waves and even them out, thereby enhancing the optical performance of the reflector.

While the method described above is the preferred embodiment of the present invention, it will be appreciated that variations of the method are also suitable for achieving an effective lamination of the glass sheet to the plastic reflector. For example, the method of the present invention has been performed in essentially the same manner as described above, with the exception that instead of coating the glass sheet with a silane solution, the silane has been added directly to the urethane adhesive resin, which also includes 5% by weight of DMF, and the resulting mixture has been applied to the front face of the reflector, after which the uncoated glass sheet is pressed against the adhesive bead in the usual manner. This method achieves a satisfactory bond between the glass sheet and the plastic reflector and has the advantage of obviating the step of coating the glass sheet separately.

Furthermore, it will be appreciated that while the post-heating step greatly enhances the curing of the silane, this step could be eliminated and the resultant marker would be commercially usable but initially it may not have the same strong adhesive bond as one produced with the past heating step.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A method of making an abrasion-resistant reflector by bonding a thin transparent glass sheet to the substantially flat planar front face of a reflector formed of a light-transmitting synthetic organic resin, comprising the steps of applying to the front face of the reflector a liquid resin and silane solution combination which is curable to a transparent solid state, placing a glass sheet having a thickness in the range of from about 2 mils to about 15 mils on the front face of the reflector so that said resin is spread to provide a substantially continuous film between the glass sheet and reflector, thereby to form a laminate, the thickness of the layer of resin and silane solution combination being great enough to accomodate the relative changes in size of the glass sheet and the reflector material in use resulting from the different thermal coefficients of expansion thereof, heating the laminate so formed to a temperature low enough to avoid optical distortion of the reflector but which approximates the maximum expected temperature in use such that the glass, in use, will substantially at all times be in compression, such heating also serving to enhance the bonding process, and curing said resin and silane solution combinatin for causing it chemically to adhere to the reflector front face and to the glass sheet, thereby securely to bond the glass sheet to the reflector front face for protection thereof against abrasion in use and without impairment of the optical qualities of the reflector.

2. The method set forth in claim 1, wherein the resin is a urethane resin.

3. The method set forth in claim 1, wherein said laminate is heated to approximately the maximum temperature expected to be experienced in use but less than 180° F.

4. The method set forth in claim 1, wherein said laminate is heated to about 150° F.

5. The method set forth in claim 1, wherein said resin is radiation curable and said heated laminate is irradiated by exposing it to ultraviolet radiation to cure said resin.

6. The method set forth in claim 1, wherein said resin and silane solution combination is applied as a bead extending centrally along the reflector so that application of the glass sheet flattens and spreads the resin and silane solution combination and expels trapped air outwardly from the laminate to provide a substantially continuous coating from which all air bubbles have been expelled.

7. The method set forth in claim 1, wherein said resin is a urethane having a thickness in said laminate in the range of from about 6 mils to about 15 mils.

8. A method of making an abrasion-resistant reflector by applying a thin transparent glass sheet to the substantially flat planar front face of a reflector formed of a light-transmitting synthetic organic resin, comprising the steps of applying to the front face of the reflector a liquid resin which is radiation curable to a transparent solid state, coating at least one side of the glass sheet with a silane solution and allowing it to dry, placing the glass sheet on the front face of the reflector with the silane-coated side contacting said resin, pressing the glass sheet against said resin until said resin provides a substantially continuous film between the glass sheet and reflector, thereby to form a laminate, the thickness of the layer of resin being great enough to accommodate the relative changes in size of the glass sheet and the reflector material in use resulting from the different thermal coefficients of expansion thereof, heating the laminate so formed to a temperature low enough to avoid distortion of the reflector but which approximates the maximum expected temperature in use such that the glass, in use, will substantially at all times be in compression, such heating also serving to enhance the bonding process, irradiating the heated laminate with radiation until said resin is cured for causing it chemically to adhere to the reflector front face and to the silane-coated glass sheet, then reheating the laminate for a time and at a temperature sufficient to significantly accelerate the final curing of the silane, thereby securely to bond the glass sheet to the reflector front face for protection thereof against abrasion in use and without impairment of the optical qualities of the reflector.

9. The method set forth in claim 8, wherein said reheating is at a temperature of about 150° F. for a time period in a range of from about 30 minutes to about 60 minutes.

10. The method set forth in claim 9, wherein said laminate is first heated to about 150° F.

11. The method set forth in claim 8, wherein said resin is an ultraviolet-curable urethane resin and said heated laminate is irradiated by exposing it to ultraviolet radiation.

12. A method of making an abrasion-resistant reflector by bonding a transparent glass sheet to the substantially flat planar front face of a pavement marker reflector formed of a light-transmitting synthetic organic resin, wherein the glass sheet has a thickness no greater than about 10 mils, comprising the steps of applying to the front face of the reflector a bead of a mixture of liquid urethane resin and silane which mixture is radiation curable to a transparent solid state, placing the glass sheet on the front face of the reflector in contact with said urethane resin and silane mixture bead to cause said urethane resin and silane mixture bead to spread to a layer of substantially continuous film between the glass sheet and reflector in the range of from about 2 mils to about 15 mils thick and from which all air bubbles have been expelled thereby to form a laminate, heating the laminate so formed to a temperature in a range of from about 130° F. to about 150° F., irradiating the heated laminate with radiation to cure the urethane resin and silance mixture and causing it chemically to adhere to the reflector front face and to the glass sheet, and then maintaining the laminate at a heated condition of about 150° F. for a time period of at least 5 minutes thereby securely to bond the glass sheet to the reflector front face for protection thereof against abrasion in use and without impairment of the optical qualities of the reflector.

13. A method of laminating a thin transparent glass sheet having a thickness no greater than about 10 mils to a plastic substrate formed of a light-transmitting synthetic organic resin, comprising the steps of applying to the substrate a liquid resin silane mixture which is radiation-curable to a transparent solid state, placing a glass sheet on the substrate until said resin silane mixture is in a substantially continuous film thereby to form a laminate, the thickness of the layer of resin silane mixture being great enough to accommodate the relative changes in size of the glass sheet and the substrate in use resulting from the different thermal coefficients of expansion thereof, heating the laminate so formed to a temperature low enough to avoid optical distortion of the substrate but which is higher than the expected maximum temperature to which the laminate will be exposed in use, so that the glass will substantially at all times be in compression in use, irradiating the heated laminate with radiation until said resin silane mixture is cured for causing it chemically to adhere to the substrate and to the glass sheet, thereby securely to bond the glass sheet to the substrate for protection thereof against abrasion in use and without impairment of the optical qualities of the substrate.

14. The method set forth in claim 13, wherein said resin layer has a thickness of between about 6 mils and 15 mils.

15. The method set forth in claim 13, wherein said resin is an acrylourethane resin.

16. The method set forth in claim 1, wherein said resin is a radiation curable urethane resin and said laminate is cured by exposing it to radiation.

17. The method set forth in claim 1, wherein said resin in an acrylourethane resin.

* * * * *

UNITED STATES PATENT AND TRADEMARK OFFICE
CERTIFICATE OF CORRECTION

PATENT NO. : 4,596,622
DATED : June 24, 1986
INVENTOR(S) : Sidney A. Heenan, et al It is certified that error appears in the above—identified patent and that said Letters Patent is hereby corrected as shown below:

Column 3, line 63, change "found" to --formed--

Column 4, line 55, change "fron" to --from--

Signed and Sealed this

Twenty-first Day of October, 1986

[SEAL]

*Attest:*

DONALD J. QUIGG

*Attesting Officer*      *Commissioner of Patents and Trademarks*